(12) United States Patent
Wang

(10) Patent No.: US 8,843,771 B2
(45) Date of Patent: *Sep. 23, 2014

(54) SERVER RACK SYSTEM WITH INTEGRATED MANAGEMENT MODULE THEREIN

(75) Inventor: Hao-Hao Wang, Shanghai (CN)

(73) Assignee: Inventec Corporation, Taipei (TW)

( * ) Notice: Subject to any disclaimer, the term of this patent is extended or adjusted under 35 U.S.C. 154(b) by 299 days.

This patent is subject to a terminal disclaimer.

(21) Appl. No.: 13/372,179

(22) Filed: Feb. 13, 2012

(65) Prior Publication Data

US 2013/0135819 A1  May 30, 2013

(30) Foreign Application Priority Data

Nov. 28, 2011  (CN) .......................... 2011 1 0383873

(51) Int. Cl.
*G06F 11/30*  (2006.01)

(52) U.S. Cl.
USPC ........... 713/300; 709/223; 709/250; 700/299; 702/132

(58) Field of Classification Search
USPC .................. 361/679.48, 679.49; 165/104.33; 700/299, 300; 702/132; 713/300; 709/250
See application file for complete search history.

(56) References Cited

U.S. PATENT DOCUMENTS

| | | | | |
|---|---|---|---|---|
| 6,058,012 A * | 5/2000 | Cooper et al. | ................ | 361/704 |
| 6,134,667 A * | 10/2000 | Suzuki et al. | ................ | 713/300 |
| 6,182,232 B1 * | 1/2001 | Klein | ............................ | 713/340 |
| 6,182,742 B1 * | 2/2001 | Takahashi et al. | ....... | 165/104.33 |
| 6,188,189 B1 * | 2/2001 | Blake | ............................ | 318/471 |
| 6,266,721 B1 * | 7/2001 | Sheikh et al. | .................. | 710/100 |
| 6,318,965 B1 * | 11/2001 | Nair | .................................. | 417/2 |
| 6,349,385 B1 * | 2/2002 | Kaminski et al. | ............. | 713/300 |
| 6,400,045 B1 * | 6/2002 | Hosokawa et al. | ........... | 307/117 |
| 6,414,843 B1 * | 7/2002 | Takeda | ..................... | 361/679.48 |
| 6,470,289 B1 * | 10/2002 | Peters et al. | .................. | 702/132 |
| 6,493,827 B1 * | 12/2002 | Mueller et al. | ................ | 713/300 |
| 6,528,987 B1 * | 3/2003 | Blake et al. | .................... | 324/168 |
| 6,643,128 B2 * | 11/2003 | Chu et al. | ................ | 361/679.48 |
| 6,813,150 B2 * | 11/2004 | King et al. | ................ | 361/679.48 |
| 6,954,358 B2 * | 10/2005 | King et al. | ................ | 361/679.02 |
| 7,051,215 B2 * | 5/2006 | Zimmer et al. | ............... | 713/300 |
| 7,235,943 B2 * | 6/2007 | Hsiang et al. | ................ | 318/471 |
| 7,325,154 B2 * | 1/2008 | King et al. | ..................... | 714/4.2 |
| 7,430,118 B1 * | 9/2008 | Noteboom et al. | ........... | 361/695 |
| 7,502,952 B2 * | 3/2009 | Chotoku et al. | .............. | 713/340 |
| 7,583,043 B2 * | 9/2009 | Chung et al. | .................. | 318/634 |
| 7,630,856 B2 * | 12/2009 | Rockenfeller et al. | ........ | 702/132 |
| 7,724,513 B2 * | 5/2010 | Coglitore et al. | ........ | 361/679.47 |

(Continued)

*Primary Examiner* — David M Sinclair
*Assistant Examiner* — Robert Brown
(74) *Attorney, Agent, or Firm* — CKC & Partners Co., Ltd.

(57) ABSTRACT

A server rack system includes a management network switch, servers, a power supply unit, fan units, and an integrated management module (IMM). Management network ports of baseboard management controllers (BMCs) of the servers are connected to the management network switch. A management network port of the power supply unit is connected to the management network switch. Management network ports of the fan units are connected to the management network switch. A management network port of the IMM is connected to the management network switch. The IMM communicates with the BMCs of the servers, the fan units, and the power supply unit through the management network switch, so as to obtain operation states of the servers, the fan units and the power supply unit, or control operations of the servers, the fan units and the power supply unit.

15 Claims, 3 Drawing Sheets

(56) References Cited

U.S. PATENT DOCUMENTS

| | | | |
|---|---|---|---|
| 7,738,251 B2 * | 6/2010 | Clidaras et al. | 361/701 |
| 7,987,024 B2 * | 7/2011 | Tunks et al. | 700/299 |
| 7,990,710 B2 * | 8/2011 | Hellriegel et al. | 361/699 |
| 8,000,103 B2 * | 8/2011 | Lipp et al. | 361/702 |
| 8,046,896 B2 * | 11/2011 | Schmitt et al. | 29/469 |
| 8,054,625 B2 * | 11/2011 | Noteboom et al. | 361/688 |
| 8,170,724 B2 * | 5/2012 | Kelley et al. | 700/299 |
| 8,279,595 B2 * | 10/2012 | Ishimine et al. | 361/679.48 |
| 8,300,410 B2 * | 10/2012 | Slessman | 361/691 |
| 8,368,329 B1 * | 2/2013 | Depew et al. | 318/272 |
| 8,390,998 B2 * | 3/2013 | Kliewer et al. | 361/679.48 |
| 8,433,935 B2 * | 4/2013 | Piazza et al. | 713/320 |
| 8,547,825 B2 * | 10/2013 | Armstrong et al. | 370/215 |
| 8,745,192 B2 * | 6/2014 | Wang | 709/223 |
| 2002/0042896 A1 * | 4/2002 | Johnson et al. | 714/47 |
| 2003/0023887 A1 * | 1/2003 | Maciorowski et al. | 713/300 |
| 2004/0158766 A1 * | 8/2004 | Liccione et al. | 714/4 |
| 2005/0004717 A1 * | 1/2005 | Fukushima et al. | 700/299 |
| 2005/0076255 A1 * | 4/2005 | Bresniker et al. | 713/320 |
| 2006/0176664 A1 * | 8/2006 | Casebolt | 361/687 |
| 2006/0259797 A1 * | 11/2006 | Fung | 713/300 |
| 2007/0006001 A1 * | 1/2007 | Isobe et al. | 713/300 |
| 2007/0069584 A1 * | 3/2007 | Dorr | 307/32 |
| 2007/0245165 A1 * | 10/2007 | Fung | 713/320 |
| 2008/0002358 A1 * | 1/2008 | Casebolt | 361/687 |
| 2008/0024977 A1 * | 1/2008 | Coglitore et al. | 361/687 |
| 2008/0059001 A1 * | 3/2008 | Artman et al. | 700/299 |
| 2008/0094797 A1 * | 4/2008 | Coglitore et al. | 361/687 |
| 2008/0198546 A1 * | 8/2008 | Pearce et al. | 361/687 |
| 2008/0271026 A1 * | 10/2008 | Haugh | 718/102 |
| 2008/0275975 A1 * | 11/2008 | Pandey et al. | 709/223 |
| 2008/0278905 A1 * | 11/2008 | Artman et al. | 361/685 |
| 2008/0313492 A1 * | 12/2008 | Hansen | 714/5 |
| 2009/0002939 A1 * | 1/2009 | Baugh et al. | 361/687 |
| 2009/0125737 A1 * | 5/2009 | Brey et al. | 713/322 |
| 2009/0167228 A1 * | 7/2009 | Chung et al. | 318/455 |
| 2009/0187783 A1 * | 7/2009 | Hansen | 713/340 |
| 2009/0240961 A1 * | 9/2009 | Koike | 713/300 |
| 2009/0271645 A1 * | 10/2009 | Mori | 713/320 |
| 2009/0281642 A1 * | 11/2009 | Ady et al. | 700/94 |
| 2010/0049995 A1 * | 2/2010 | Casey et al. | 713/300 |
| 2010/0070789 A1 * | 3/2010 | Hori et al. | 713/324 |
| 2010/0076607 A1 * | 3/2010 | Ahmed et al. | 700/276 |
| 2010/0079094 A1 * | 4/2010 | Beltman et al. | 318/460 |
| 2010/0091449 A1 * | 4/2010 | Clidaras et al. | 361/679.49 |
| 2010/0110626 A1 * | 5/2010 | Schmitt et al. | 361/679.47 |
| 2010/0118484 A1 * | 5/2010 | Sasagawa et al. | 361/679.37 |
| 2010/0161152 A1 * | 6/2010 | Scrivener et al. | 700/299 |
| 2010/0165565 A1 * | 7/2010 | Hellriegal et al. | 361/679.46 |
| 2010/0165983 A1 * | 7/2010 | Aybay et al. | 370/388 |
| 2010/0170277 A1 * | 7/2010 | Schmitt et al. | 62/259.2 |
| 2010/0290183 A1 * | 11/2010 | Rijken et al. | 361/679.48 |
| 2011/0051357 A1 * | 3/2011 | Orr et al. | 361/679.48 |
| 2011/0122573 A1 * | 5/2011 | Peng et al. | 361/679.48 |
| 2011/0184568 A1 * | 7/2011 | Tai et al. | 700/282 |
| 2011/0292593 A1 * | 12/2011 | June et al. | 361/679.47 |
| 2012/0010754 A1 * | 1/2012 | Matteson | 700/282 |
| 2012/0017074 A1 * | 1/2012 | Kelly | 713/100 |
| 2012/0173894 A1 * | 7/2012 | Driggers | 713/300 |
| 2012/0204051 A1 * | 8/2012 | Murakami et al. | 713/324 |
| 2012/0242151 A1 * | 9/2012 | Seaton et al. | 307/65 |
| 2012/0253544 A1 * | 10/2012 | Lu | 700/300 |
| 2012/0272078 A1 * | 10/2012 | Anderson et al. | 713/320 |
| 2013/0010419 A1 * | 1/2013 | Armstrong et al. | 361/679.31 |
| 2013/0010639 A1 * | 1/2013 | Armstrong et al. | 370/254 |
| 2013/0013759 A1 * | 1/2013 | Austen et al. | 709/223 |
| 2013/0021746 A1 * | 1/2013 | Campbell et al. | 361/679.47 |
| 2013/0054047 A1 * | 2/2013 | Uhlmann et al. | 700/300 |
| 2013/0073096 A1 * | 3/2013 | Brey et al. | 700/282 |
| 2013/0080796 A1 * | 3/2013 | Matsubara et al. | 713/300 |
| 2013/0081048 A1 * | 3/2013 | Kobayashi et al. | 718/105 |
| 2013/0103210 A1 * | 4/2013 | Brey et al. | 700/282 |
| 2013/0131885 A1 * | 5/2013 | Huang et al. | 700/300 |
| 2013/0138979 A1 * | 5/2013 | Wang | 713/300 |
| 2013/0138997 A1 * | 5/2013 | Wang | 714/4.11 |
| 2013/0166091 A1 * | 6/2013 | Chiu et al. | 700/299 |

* cited by examiner

SERVER RACK SYSTEM WITH INTEGRATED MANAGEMENT MODULE THEREIN

CROSS-REFERENCE TO RELATED APPLICATION

This application claims the priority benefit of China application serial no. 201110383873.1, filed on Nov. 28, 2011. The entirety of the above-mentioned patent application is hereby incorporated by reference herein and made a part of this specification.

BACKGROUND OF THE INVENTION

1. Field of the Invention

The present invention generally relates to a server, in particular, to a server rack system.

2. Description of Related Art

FIG. 1 is a schematic block diagram of a conventional server rack. In a conventional rack 100, a service network switch 120 and multiple servers 110_1-110_*n* are disposed. The servers 110_1-110_*n* each have a service network port, and the service network ports are all connected to the service network switch 120. The servers 110_1-110_*n* are connected to an Internet 10 through the service network switch 120. In the conventional rack 100, each server manages internal power consumption and temperature thereof respectively, and the conventional management technique has a problem of poor energy-saving effectiveness. On the other hand, each server is an independent system. Each server respectively includes an AC-to-DC power supply, and multiple small fans for heat dissipation. However, large numbers of the power supplies and small fans for heat dissipation increase the manufacturing cost.

SUMMARY OF THE INVENTION

Accordingly, the present invention is directed to a server rack system, which manages servers, fan units, and a power supply unit in a rack system through a network.

An embodiment of the present invention provides a server rack system, which includes a first network switch, multiple servers, at least one power supply unit, multiple fan units and an integrated management module (IMM). The first network switch is coupled to a management network. The servers each have a baseboard management controller (BMC). The BMCs each have a management network port. The management network ports of the BMCs are connected to the first network switch. A management network port of the power supply unit is connected to the first network switch. The fan units each have a management network port, and the management network ports of the fan units are connected to the first network switch. A management network port of the IMM is connected to the first network switch. The IMM communicates with the BMCs of the servers, the fan units, and the power unit through the first network switch, so as to obtain operation states of the servers, the fan units and the power supply unit, or control operations of the servers, the fan units and the power supply unit.

Based on the above, the server rack system disclosed in the embodiment of the present invention manages operation states of the servers, the fan units and the power supply unit through the first network switch by using the IMM, so as to obtain preferred cost effectiveness and energy-saving effectiveness.

In order to make the above features and advantages of the present invention more comprehensible, embodiments are illustrated in detail below through accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
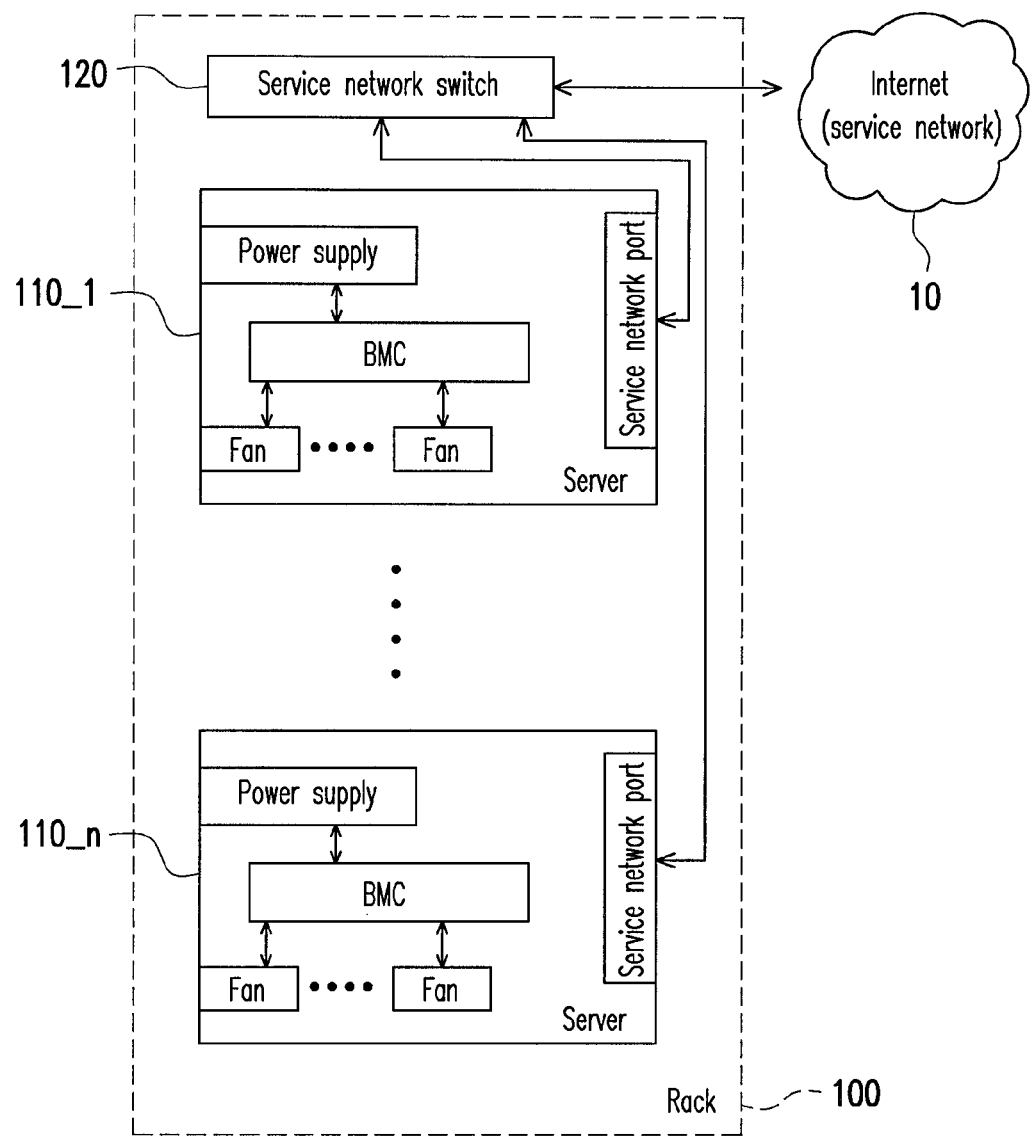
FIG. 1 is a schematic block diagram of a conventional server rack.

Reference will now be made in detail to the present embodiments of the invention, examples of which are illustrated in the accompanying drawings. Wherever possible, the same reference numbers are used in the drawings and the description to refer to the same or like parts.

Figure 2:
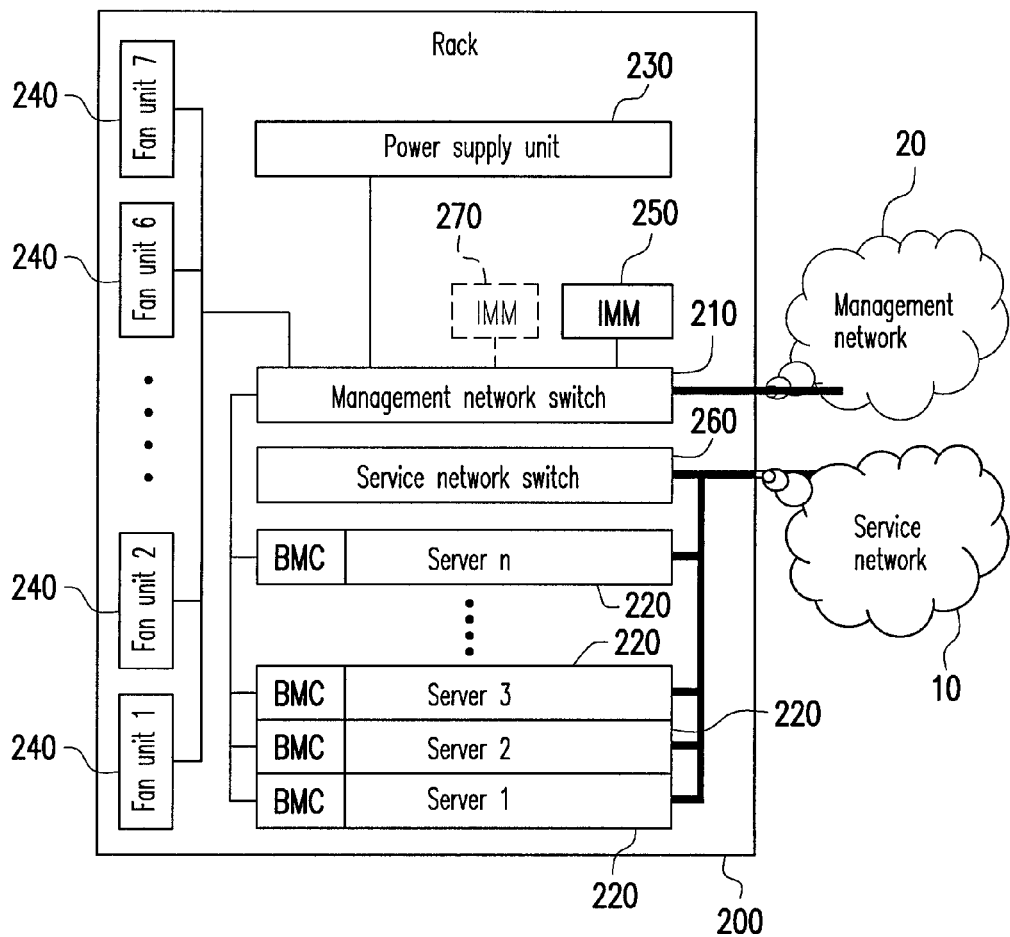
FIG. 2 is a schematic view of functional modules of a server rack system according to an embodiment of the present invention.

In this embodiment, fan units and a power supply unit disposed in a rack replace fans and power supplies in a conventional server, so as to facilitate centralized management on power source and fans, thereby obtaining better cost effectiveness and energy-saving effectiveness. For example, FIG. 2 is a schematic view of functional modules of a server rack system 200 according to an embodiment of the present invention. The server rack system 200 includes a first network switch 210, multiple servers 220, at least one power supply unit 230, multiple fan units 240, an integrated management module (IMM) 250, and a second network switch 260.

The servers 220 each have a service network port. Multiple network connection ports of the second network switch 260 (that is, a service network switch) are respectively connected to the service network ports of the servers 220. The servers 220 provide services to a service network 10 (for example, an Internet) through the second network switch 260.

The servers 220 each have a baseboard management controller (BMC), and the BMCs each have a management network port. The BMC is a well-known technique of the server, and is not repeated here. The management network ports of the BMCs are respectively connected to one of multiple network connection ports of the first network switch 210. The first network switch 210 (that is, a management network switch) is coupled to a management network 20. The management network 20 may be a local area network (LAN), such as Ethernet. The first network switch 210 may be an Ethernet switch or another LAN switch.

The management network port of the IMM 250 is connected to the first network switch 210. The IMM 250 communicates with the BMCs of the servers 220 through the first network switch 210, so as to obtain operation states of the servers 220 (for example, operation states such as internal temperatures of the servers), and/or control operations of the servers 220 (for example, control operations such as switching on and off of the servers, and updating of firmware).

The server rack system 200 is configured with at least one power supply unit 230. The power supply unit 230 supplies power to the server rack system 200, for example, supplies power to the first network switch 210, the second network switch 260, the servers 220, the fan units 240, and the IMM 250. The power supply unit 230 has a management network port. The management network port of the power supply unit 230 is connected to the first network switch 210. The IMM 250 may communicate with the power supply unit 230 through the first network switch 210, so as to obtain an operation state of the power supply unit 230, and/or control an operation of the power supply unit 230. For example, the IMM 250 may obtain related power consumption information of the server rack system 200 through the first network switch 210, for example, obtains power consumption of all the servers 220. According to the power consumption information, the IMM 250 sends a control command to the power supply unit 230 through the first network switch 210, so as to control/adjust power output of the power supply unit 230.

Figure 3:
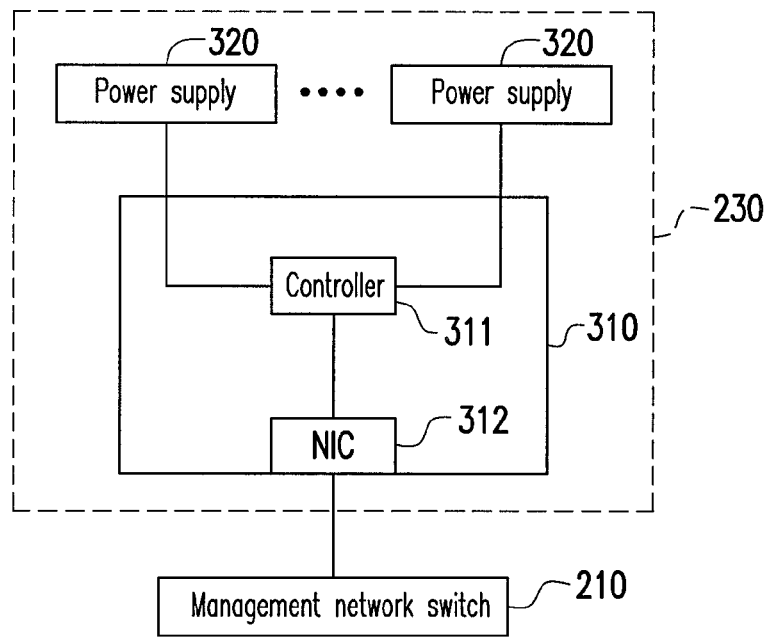
FIG. 3 is a schematic view of functional modules of a power supply unit shown in FIG. 2 according to an embodiment of the present invention.

FIG. 3 is a schematic view of functional modules of a power supply unit 230 shown in FIG. 2 according to an embodiment of the present invention. The power supply unit 230 includes a power distribution board (PDB) 310 and multiple power supplies 320. Referring to FIG. 2 and FIG. 3, a management network port of the PDB 310 is connected to the first network switch 210. The multiple power supplies 320 are connected to the PDB 310. The power supplies 320 supply power to the server rack system 200 under the control of the PDB 310. The IMM 250 sends a control command to the PDB 310 through the first network switch 210. The PDB 310 controls outputs of the power supplies 320 according to the control command. In this embodiment, the PDB 310 includes a controller 311 and a network interface card (NIC) 312. The controller 311 may receive the control command of the IMM 250 through the NIC 312 and the first network switch 210. According to the control command, the controller 311 correspondingly controls the power supplies 320 through a bus. The bus between the controller 311 and the power supply 320 may be a power management bus (PMBUS) or another bus.

Referring to FIG. 2, the server rack system 200 is configured with multiple fan units 240, for example, FIG. 2 shows seven fan units 240. The fan units 240 each have a management network port. The management network ports of the fan units 240 are connected to the first network switch 210. The IMM 250 may communicate with the fan units 240 through the first network switch 210, so as to obtain operation states of the fan units 240 (for example, detecting rotational speeds of the fans), or control operations of the fan units 240 (for example, adjusting rotational speeds of the fans). For example, the IMM 250 accesses the BMCs of the servers 220 through the first network switch 210, so as to obtain temperature values of the servers 220. According to the temperature values of the servers 220, the IMM 250 sends a control command to the fan units 240 through the first network switch 210, so as to control/adjust the rotational speeds of the fans of the fan units 240.

In some embodiments, the IMM 250 looks up a "Fan Speed Control Table" according to the temperature values of the servers 220. The fan speed control table records corresponding relationships of the temperature values and the rotational speeds of the fans. Therefore, the IMM 250 may obtain the rotational speed values of the fan units 240 from the fan speed control table. According to the rotational speed values of the fan units 240, the IMM 250 sends a control command to the fan units 240 through the first network switch 210, so as to control/adjust the rotational speeds of the fans of the fan units 240.

Figure 4:
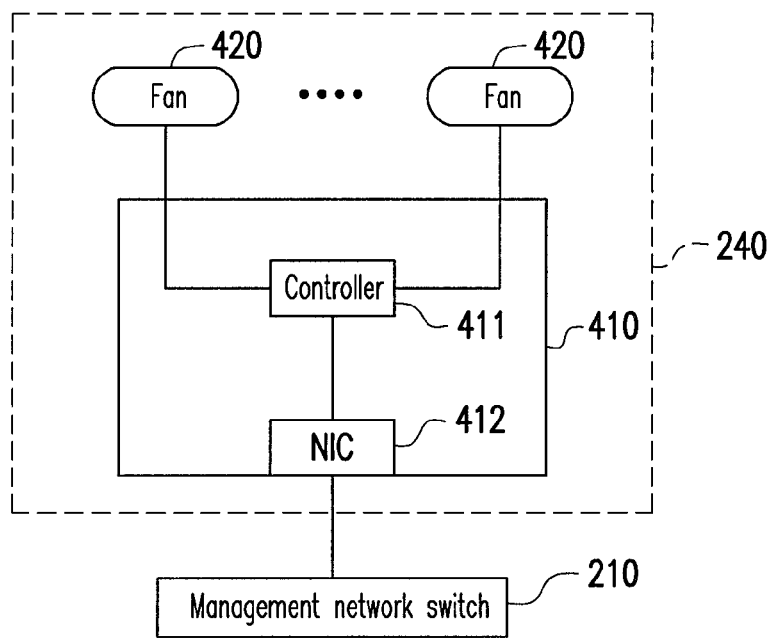
FIG. 4 is a schematic view of functional modules of a fan unit shown in FIG. 2 according to an embodiment of the present invention.

FIG. 4 is a schematic view of functional modules of a fan unit 240 shown in FIG. 2 according to an embodiment of the present invention. The fan unit 240 includes a fan control panel 410 and multiple fans 420. Referring to FIG. 2 and FIG. 4, a management network port of the fan control panel 410 is connected to the first network switch 210. The multiple fans 420 are connected to the fan control panel 410. The IMM 250 sends a control command to the fan control panel 410 through the first network switch 210. The fan control panel 410 controls rotational speeds of the fans 420 according to the control command. In this embodiment, the fan control panel 410 includes a controller 411 and an NIC 412. The controller 411 may receive the control command of the IMM 250 through the NIC 412 and the first network switch 210. According to the control command, the controller 411 correspondingly controls the fans 420 through a bus. The bus between the controller 411 and the fans 420 may be a System Management Bus (SMBus) or another bus.

Referring to FIG. 2, the first network switch 210 may be connected to a remote management station through the management network 20. The servers 220, the power supply unit 230 and the fan units 240 each have an NIC. That is to say, the servers 220, the power supply unit 230 and the fan units 240 each have a different Media Access Control (MAC) address and a different Internet Protocol (IP) address. Therefore, the remote management station may communicate with the IMM 250, the servers 220, the power supply unit 230 and/or the fan units 240 through the first network switch 210. How to perform communication by using the MAC addresses or the IP addresses is a well-known technique in the field of network communications, and details about the communication are not repeated here. Therefore, the remote management station may obtain the operation states of the power supply unit 230 and/or the fan units 240 by accessing the IMM 250. Moreover, the remote management station may directly access the power supply unit 230 and/or the fan units 240, without through the IMM 250.

In some embodiments, the server rack system 200 adopt a full-network architecture, so the server rack system 200 may easily manage/update firmware of all devices in the rack in a centralized manner. For example, the IMM 250 stores installation firmware of the servers 220, the power supply unit 230 and/or the fan units 240. The installation firmware includes images and/or update software. When the server rack system 200 is started up, the IMM 250 may read, through the first network switch 210, a version serial number (or other version information) of current installation firmware of each of the servers 220, the power supply unit 230 and/or the fan units 240, and compares the version serial numbers with version serial numbers of installation firmware stored in the IMM 250 to see whether they are consistent. When the version serial numbers are not consistent, the IMM 250 may update the current installation firmware by using the installation firmware stored in the IMM 250.

For example, the IMM 250 stores installation firmware of the servers 220. When the server rack system 200 is started up, the IMM 250 may read a version serial number of current installation firmware of each of the servers 220 through the first network switch 210, and compares the version serial numbers of the current installation firmware in the servers 220 and version serial numbers of installation firmware stored in the IMM 250 to see whether they are consistent. If the IMM 250 finds that the current installation firmware of a number 1 server 220 is of an old version and the installation firmware stored in the IMM 250 is of a new version, the IMM 250 may update the old current installation firmware in the number 1 server 220 by using the new installation firmware.

In other embodiments, the IMM 250 may store in advance corresponding relationships of identification information and in-rack positions (for example, a rack device table) of the servers 220, the power supply unit 230 and/or the fan units 240, with the management network ports. The identification information may include MAC addresses and/or numbers (such as device numbers and asset numbers).

During the operation of the system, the IMM 250 may access the first network switch 210 through a Command Line Interface (CLI), so as to obtain corresponding relationships of the MAC addresses of the servers, the power supply unit and/or the fan units with the management network ports and generated by the first network switch 210, and obtain corresponding relationships of the identification information, in-rack positions, and the MAC addresses of the servers, the power supply unit and/or the fan units according to the corresponding relationships of the identification information and the in-rack positions of the servers, the power supply unit and/or the fan units with the management network ports.

For example, the server rack system 200 configures devices such as the network switches, the servers, the power supply unit, and the fan units in the rack according to the "Rack Device Table" as shown in Table 1. For example, according to the rack device table shown in Table 1, a number 7 fan unit is placed at a 7th layer at a rear side of the rack and occupies a height of 6 layers of the servers. The number 1 server is placed at a 1st layer at a front side of the rack and occupies a height of 1 layer.

TABLE 1

Rack Device Table

| Device Type | Device Number | Height | Rack Position | Device Index |
|---|---|---|---|---|
| Server | 1 | 1 | Front 1 | 1 |
| ... | ... | ... | ... | ... |
| Server | 18 | 1 | Front 18 | 18 |
| Server | 19 | 1 | Front 25 | 19 |
| ... | ... | ... | ... | ... |
| Server | 36 | 1 | Front 42 | 36 |
| Fan unit | 1 | 6 | Rear 1 | 37 |
| ... | ... | ... | ... | ... |
| Fan unit | 7 | 6 | Rear 7 | 43 |
| IMM | 1 | 1 | Front 19 | 44 |
| IMM | 2 | 1 | Front 20 | 45 |
| Service network switch | 1 | 1 | Front 21 | 46 |
| Management network switch | 1 | 1 | Front 22 | 47 |
| Power supply unit | 1 | 2 | Front 23 | 48 |

In addition, the first network switch 210 has 48 LAN ports, and the LAN ports of the first network switch 210 are connected to the devices, such as the servers, the power supply unit, and the fan units, at the corresponding positions, according to a "Port Device Position Table" shown in Table 2. For example, according to the port device position table, a first network port of the network switch 210 is specified to be connected to the number 1 server (that is, the device located at the first layer of the rack), the rest may be deduced through analog, and a 36th network port of the network switch 210 is specified to be connected to a number 36 server (that is, the device located at the 42nd layer of the rack). A 40th network port of the network switch 210 is specified to be connected to the IMM 250 (that is, the device located at the 19th layer of the rack). A 41st network port of the network switch 210 is specified to be connected to the power supply unit 230 (that is, the device located at the 23rd layer of the rack).

TABLE 2

Port Device Position Table

| Port | Device Type | Device Number |
|---|---|---|
| 1 | Server | 1 |
| ... | ... | ... |
| 36 | Server | 36 |
| 39 | | |
| 40 | IMM | 1 |
| 41 | Power supply unit | 1 |
| 42 | Fan unit | 1 |
| ... | ... | ... |
| 48 | Fan unit | 7 |

Based on the "Rack Device Table" shown in Table 1 and referring to the "Port Device Position Table" shown in Table 2, it is known that a number 7 fan unit is connected to a number 48 network port of the switch, and the number 1 server is connected to a number 1 network port. By accessing the switch 210 through the CLI, a MAC address of a device connected to a number 10 network port the switch 210 and a MAC address of a device connected to the number 1 network port of the switch 210 may be obtained. Therefore, the IMM 250 may obtain static connections and position s of the servers 220, the power supply unit 230 or the fan units 240 in the whole rack device 200 with reference to the "Rack Device Table" shown in Table 1 and the "Port Device Position Table" shown in Table 2.

During the operation of the system, through the CLI (for example, a serial port or Telnet) of the switch 210, the IMM 250 and the switch 210 may access with each other, so as to obtain a port MAC address table (that is, a PORT_MAC table), and the port MAC address table has a port field and a MAC address field. For example, the IMM 250 may know, from the port MAC address table of the switch 210, the MAC address of the device connected to the number 1 network port of the switch 210, and the MAC address of the device connected to the number 10 network port of the switch 210. The IMM 250 parses communication packets according to the MAC addresses in the port MAC address table, so as to obtain IP addresses of the servers, the power supply unit or the fan units. Therefore, the IMM 250 may obtain IP addresses corresponding to devices inserted in specific network ports of the switch 210. For example, the IMM 250 may obtain the IP address of the number 7 fan unit 240 connected to the number 48 network port of the switch, and obtain the IP address of the number 1 server 220 connected to the number 1 network port of the switch. At this time, the IMM 250 may recognize that the number 7 fan unit 240 and the number 1 server 220 are in position. Therefore, the IMM 250 may perform communication with the servers 220, the power supply unit 230 and/or the fan units 240 in specific rack positions by using the corresponding IP addresses.

In another embodiment, the IMM 250 stores, in advance, corresponding relationships of the identification information of the servers 220, the power supply unit 230 and/or the fan units 240 with asset numbers. Referring to the related illustration of the above embodiments, with reference to the "Rack Device Table" shown in Table 1 and the "Port Device Position Table" shown in Table 2, the IMM 250 may obtain the identification information (for example, device numbers) of the servers 220, the power supply unit 230 and/or the fan units 240 of the whole rack device 200, obtain corresponding relationships of the identification information and positions of corresponding devices in the rack, and even obtain corresponding relationships of the identification information and the MAC addresses. According to the corresponding relationships of the identification information and the in-rack positions and the corresponding relationships of the identification information and the MAC addresses, the IMM 250 may generate corresponding relationships of the following four times of the devices such as the servers 220, the power supply unit 230 and/or the fan units 240: identification information, in-rack positions, MAC addresses and assert numbers, and accordingly perform assert management and assert location on the devices such as the servers 220, the power supply unit 230 and/or the fan units 240.

The IMM 250 may further upload the corresponding relationships of the identification information, in-rack positions, MAC addresses and assert numbers of the devices such as the servers 220, the power supply unit 230 and/or the fan units 240 to the remote management station through the first network switch 210. According to the above operation procedure, when replacing a device, the MAC address is also updated, so the asset number may be updated in time. With reference to the "Rack Device Table" shown in Table 1 and the "Port Device Position Table" shown in Table 2 again, the IMM 250 may provide a specific position of the new device to the remote management station. The IMM 250 may also upload the rack device table automatically, or provide an in-time query, for a user (or the remote management station) to perform tabulate statistics on the assert of multiple rack devices. Accordingly, the IMM 250 may perform assert management and assert location on the servers 220, the power supply unit 230 and/or the fan units 240.

It should be noted that, referring to FIG. 2, whether a standby IMM 270 is configured to the server rack system 200 may be determined according to design requirements of actual products. A management network port of the standby IMM 270 is connected to the first network switch 210. The standby IMM 270 has functions the same as those of the IMM 250, and may also perform operations the same as those of the IMM 250. When the IMM 250 fails, the standby IMM 270 may replace the IMM 250 to work.

In view of the above, the IMM 250 in the embodiment of the present invention serves as a management centre of the whole rack. The IMM 250 is connected to all of the fan units 240, the power supply unit 230 and the BMCs of the server 220 through a high-speed Ethernet (10/100M). The IMM 250, through the BMCs of the servers 220, obtains temperature of each server 220, calculates to obtain optimized rotational speed of a fan, and sends a command to the fan unit 240 through the management network so as to control the rotational speed of the fan. Alternatively, the IMM 250, through the BMCs of the servers 220, obtains power consumption information of each server 220, so as to obtain the total power consumption of all the servers 220. According to the total power consumption, the IMM 250 sends a command to the power supply unit 230 through the management network, so as to optimize power source output of the power supply unit 230, thereby achieving the object of energy-saving. In some embodiments, two IMMs may be deployed in one rack, so as to provide stable management to the whole rack in a 1+1 redundancy manner. All devices in the rack are connected in a full-network manner, and therefore, the server rack system 200 has the following advantages: having high speed (100M Ethernet), easy deployment (only needing to change network connections), and capable of realizing location and management of each device through a switch without any additional hardware.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A server rack system, comprising:
    a first network switch, coupled to a management network;
    multiple servers, each comprising a baseboard management controller (BMC), wherein the BMCs each comprises a management network port, and the management network ports are connected to the first network switch;
    at least one power supply unit, wherein a management network port of the power supply unit is connected to the first network switch;
    multiple fan units, each comprising a management network port, wherein the management network ports of the fan units are connected to the first network switch; and
    an integrated management module (IMM), wherein a management network port of the IMM is connected to the first network switch, the IMM communicates with the BMCs of the servers, the fan units, and the power supply unit through the first network switch, so as to obtain operation states of the servers, the fan units, and the power supply unit, or control operations of the servers, the fan units, and the power supply unit.

2. The server rack system according to claim 1, wherein the first network switch is an Ethernet switch.

3. The server rack system according to claim 1, wherein the servers each comprise a service network port, and the server rack system further comprises:
    a second network switch, connected to the service network ports of the servers, wherein the servers provide services to an Internet through the second network switch.

4. The server rack system according to claim 1, wherein the first network switch is connected to a remote management station through the management network, and the remote management station communicates with the IMM, the servers, the power supply unit and/or the fan units through the first network switch.

5. The server rack system according to claim 1, wherein the IMM accesses the BMCs of the servers through the first network switch to obtain temperature values of the servers, and sends a control command to the fan units through the first network switch according to the temperature values, so as to control rotational speeds of the fan units.

6. The server rack system according to claim 5, wherein the IMM looks up a fan speed control table according to the temperature values of the servers, so as to obtain the rotational speeds of the fan units.

7. The server rack system according to claim 1, wherein the IMM obtains power consumption of the server rack system through the first network switch, and sends a control command to the power supply unit through the first network switch according to the power consumption, so as to control power output of the power supply unit.

8. The server rack system according to claim 1, wherein the power supply unit comprises:
    a power distribution board (PDB), wherein a management network port of the PDB is connected to the first network switch; and
    multiple power supplies, connected to the PDB, wherein the power supplies supply power to the server rack system according to the control of the PDB,
    wherein the IMM sends a control command to the PDB through the first network switch, and the PDB controls outputs of the power supplies according to the control command.

9. The server rack system according to claim 1, wherein the fan unit comprises:
- a fan control panel, wherein a management network port of the fan control panel is connected to the first network switch; and
- multiple fans, connected to the fan control panel, wherein the IMM sends a control command to the fan control panel through the first network switch, and the fan control panel controls rotational speeds of the fans according to the control command.

10. The server rack system according to claim 1, wherein the IMM pre-stores corresponding relationships of identification information and in-rack positions of the servers, the power supply unit and/or the fan units with the management network ports of the first network switch; during operation of the system, the IMM obtains corresponding relationships of media access control (MAC) addresses of the servers, the power supply unit and/or the fan units with the management network ports of the first network switch and generated by the first network switch, and obtains corresponding relationships of the identification information and the in-rack positions of the servers, the power supply unit and/or the fan units with the MAC addresses according to the corresponding relationships of the identification information and the in-rack positions of the servers, the power supply unit and/or the fan units with the management network ports of the first network switch, and the IMM obtains Internet Protocol (IP) addresses of the servers, the power supply unit and/or the fan units corresponding to the MAC addresses, and communicates with the servers, the power supply unit and/or the fan units at specific in-rack positions by using the IP addresses.

11. The server rack system according to claim 10, wherein the identification information of the servers, the power supply unit and/or the fan units at least comprises numbers of the servers, the power supply unit and/or the fan units.

12. The server rack system according to claim 10, wherein the IMM pre-stores corresponding relationships of the identification information and asset numbers of the servers, the power supply unit and/or the fan units, the IMM generates corresponding relationships of the identification information, the in-rack positions, the MAC addresses and the asset numbers of the servers, the power supply unit and/or the fan units according to the corresponding relationships of the identification information, the in-rack positions and the MAC addresses of the servers, the power supply unit and/or the fan units, and performs asset management and asset location for the servers, the power supply unit and/or the fan units accordingly.

13. The server rack system according to claim 12, wherein the IMM further uploads to a remote management station the corresponding relationships of the identification information, the in-rack positions, the MAC addresses and the asset numbers of the servers, the power supply unit and/or the fan units through the first network switch.

14. The server rack system according to claim 1, further comprising:
- a standby IMM, wherein a management network port of the standby IMM is connected to the first network switch, and when the IMM fails, the standby IMM replaces the IMM to work.

15. The server rack system according to claim 1, wherein the IMM stores installation firmware of the servers, the power supply unit and/or the fan units; when the server rack system starts up, the IMM reads a version serial number of current installation firmware of each of the servers, the power supply unit and/or the fan units through the first network switch, compares the version serial numbers and version serial numbers of the installation firmware stored in the IMM to see whether they are consistent, and updates the current installation firmware according to the installation firmware stored in the IMM when they are not consistent.

* * * * *